US006784410B2

(12) United States Patent
Ishizuka

(10) Patent No.: US 6,784,410 B2
(45) Date of Patent: Aug. 31, 2004

(54) IMAGE INPUT SYSTEM, IMAGE INPUT APPARATUS, IMAGE INPUT METHOD, PROGRAM, AND STORAGE MEDIUM

(75) Inventor: Daisuke Ishizuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 10/054,120

(22) Filed: Jan. 22, 2002

(65) Prior Publication Data

US 2002/0096626 A1 Jul. 25, 2002

(30) Foreign Application Priority Data

Jan. 24, 2001 (JP) ........................................ 2001-015584

(51) Int. Cl.⁷ .............................................. H01L 27/00
(52) U.S. Cl. .................... 250/208.1; 250/205; 250/235; 358/475; 347/235
(58) Field of Search .............................. 250/208.1, 205, 250/214 R, 235; 358/474, 475; 347/229, 234, 235

(56) References Cited

U.S. PATENT DOCUMENTS

| 3,947,117 | A | * | 3/1976 | Basu et al. .................. 250/205 |
| 5,151,797 | A | * | 9/1992 | Nosaki et al. ............... 358/474 |
| 5,336,976 | A | * | 8/1994 | Webb et al. ................. 315/134 |
| 5,414,535 | A | * | 5/1995 | Kanmoto et al. ............ 358/475 |
| 5,592,306 | A | * | 1/1997 | Cheng ......................... 358/475 |
| 5,834,762 | A | * | 11/1998 | Matsuda et al. .......... 250/208.1 |
| 5,900,950 | A | * | 5/1999 | Hsu ............................. 358/474 |
| 5,907,742 | A | * | 5/1999 | Johnson et al. ................ 399/51 |
| 6,175,666 | B1 | * | 1/2001 | Yoshida ....................... 358/474 |
| 6,316,767 | B1 | * | 11/2001 | Paxton et al. ............... 358/475 |
| 6,476,370 | B1 | * | 11/2002 | Suzuki et al. ............ 250/208.1 |
| 6,483,095 | B1 | * | 11/2002 | Iwaki ..................... 250/214 R |

FOREIGN PATENT DOCUMENTS

JP 2000-287037 10/2000

OTHER PUBLICATIONS

First Office Action–Patent Office of People's Republic of China–Application 02102725.0.
English Abstract of JPA2000–287037.

* cited by examiner

Primary Examiner—Diego Gutierrez
Assistant Examiner—Madeline Gonzalez
(74) Attorney, Agent, or Firm—Morgan & Finnegan, L.L.P.

(57) ABSTRACT

It is an object of this invention to provide an image input system, image input apparatus, and image input method which can greatly reduce the time before actual image reading is started, and which is easy to use in accordance with a power-saving standard. To achieve this object, an image input system having an image input apparatus whose image reading is controllable from an external apparatus includes a light source light amount controller for controlling a light source for illuminating an original, and a switch for designating the start of original image reading. When designation of the start of original image reading is detected, the light source light amount controller turns on the light source and starts light amount adjustment, and the start of the image input apparatus from the external apparatus is designated.

19 Claims, 8 Drawing Sheets

IMAGE INPUT SYSTEM, IMAGE INPUT APPARATUS, IMAGE INPUT METHOD, PROGRAM, AND STORAGE MEDIUM

FIELD OF THE INVENTION

The present invention relates to an image input system, image input apparatus, image input method, program, and storage medium applied to a scanner, copying machine, and the like.

BACKGROUND OF THE INVENTION

With the recent explosive spread of personal computers, demands for their peripheral devices are also rapidly increasing. In particular, image input apparatuses, so-called scanners, are incredibly becoming popular.

Accordingly, in addition to the conventional designer's demands such as high image quality and high resolution, it is being newly required to ripen products in respect of convenience, e.g., the ease of use in general homes.

For example, a user can easily load an image only by pressing a scan start switch of a scanner body, without performing any complicated setting. As represented by this function, considerations for beginners, i.e., the ease and rapidness with which images can be loaded, occupy a large distribution in this market.

Also, low power consumption is the keyword in the recent electric product industry, and many standards for the purpose are being proposed.

To obtain indices accepted by general customers by achieving items determined by these standards, the manufacturers often incorporate power saving functions in their products.

Scanners have a standard called "ENERGY STAR" which is an index of power saving of electric products. This standard provides that the power consumption should be lowered to 12 W or less during standby. To meet this standard, a function is incorporated by which if an original illuminating light source which consumes particularly large power has not been used for a predetermined time, a standby mode begins, and a lamp as the light source is automatically turned off.

The following problems arise if this function is incorporated.

The light amount of the lamp used as the original illuminating light source in a scanner largely depends upon the temperature characteristics. That is, to reach a sufficient light amount having little fluctuation by which scan can be started, a certain time is necessary after the lamp is turned on.

When the lamp is OFF in a conventional scanner, information indicating that a scan start switch is pressed is transmitted from the scanner to a computer by communication. After receiving this information, the computer activates an application program necessary for scan. When the activation is complete, the computer instructs, by communication, the scanner to start scanning, and the scanner which has received this instruction turns on the lamp for the first time. Additionally, after waiting until the light amount (temperature) of this lamp stabilizes, the scanner starts reading (scanning) actual images.

Accordingly, a long time is required after the user starts scanning and before actual image reading is started. This gives the user a long waiting time and, if this waiting time is unexpectedly long, makes the user anxious about whether the scanner is operating normally.

Furthermore, with the present advancing cost down, the lamp is also beginning to be replaced with an inexpensive lamp having inferior temperature characteristics. This, for the reasons explained above, further worsens the convenience for users, resulting in a serious problem.

SUMMARY OF THE INVENTION

The present invention has been made in consideration of the above situation, and has as its first object to provide an image input system, image input apparatus, and image input method which can greatly reduce the time before actual image reading is started, and which also save power and are easy to use.

It is the second object of the present invention to provide a program for implementing the image input method of the present invention as described above.

It is the third object of the present invention to provide a storage medium storing the program of the present invention described above.

To solve the problems and achieve the objects described above, an image input apparatus according to the present invention is characterized by the following arrangement.

That is, an image input apparatus connected to an external apparatus and controllable from the external apparatus, comprises a first light source for illuminating an original, a first light source controller for controlling the first light source, a detector for detecting that the start of original image reading is designated, and a communication circuit for communicating with the external apparatus, wherein if the detector detects that the start of original image reading is designated, control is performed such that the first light source controller turns on the first light source and starts light amount adjustment, and the communication circuit transfers the detection result obtained by the detector to the external apparatus.

An image input system according to the present invention is characterized by the following arrangement.

That is, an image input system having an image input apparatus connected to an external apparatus and controllable from the external apparatus, comprises a light source for illuminating an original, a light source controller for controlling the light source, a detector for detecting that the start of original image reading is designated, and a communication circuit for performing communication between the image input apparatus and the external apparatus, wherein if the detector detects that the start of original image reading is designated, control is performed such that the light source controller turns on the light source and starts light amount adjustment, and the start of image read control of the image input apparatus is designated from the external apparatus in accordance with the detection result obtained by the detector.

An image input method according to the present invention is characterized by the following arrangement.

That is, an image input method using an image input apparatus connected to an external apparatus and controllable from the external apparatus, comprises the light source control step of controlling a light source for illuminating an original, the detection step of detecting that the start of original image reading is designated, and the image reading step of reading an original image illuminated with the light source, on the basis of the detection result in the detection step, wherein if the detection step detects that the start of original image reading is designated, the light source control step turns on the light source, and the start of the image reading step is designated by control from the external apparatus in accordance with the detection result obtained in the detection step.

A program according to the present invention is characterized by the following arrangement.

That is, this program allows a computer to implement the above image input method.

A storage medium according to the present invention is characterized by the following arrangement.

That is, this storage medium stores the above program in a computer-readable manner.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will now be described in detail in accordance with the accompanying drawings.

(First Embodiment)

The first embodiment of the present invention will be described below with reference to FIGS. 1 to 7B.

Figure 1:
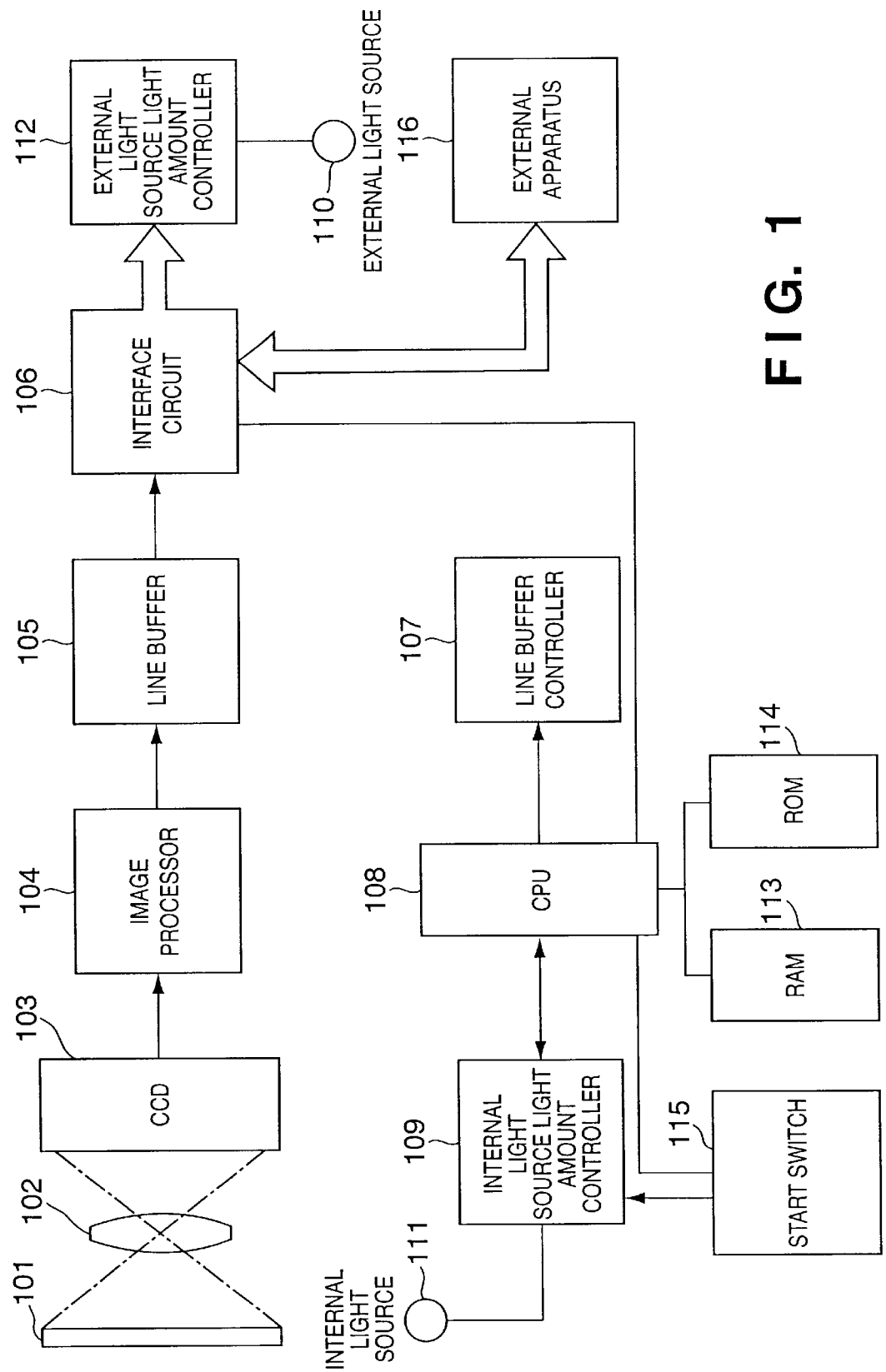
FIG. 1 is a block diagram showing the hardware configuration of an image input system according to the first embodiment of the present invention.

FIG. 1 is a block diagram showing the hardware configuration of an image input system according to this embodiment. Referring to FIG. 1, reference numeral 101 denotes an original; 102, a lens; 103, an image sensor (CCD) for converting an image formed by the lens 102 into an electrical signal; 104, an image processor which processes a read signal to generate a binary signal; and 105, a line buffer for start/stop.

Reference numeral 106 denotes an interface circuit used for communication with an external apparatus 116 (to be described later) and an external optional apparatus; 107, a line buffer controller for controlling the line buffer 105 in units of color light sources; 108, a CPU (Central Processing Unit); 109, an internal light source light amount controller (light source ON/OFF controller) for controlling the light amount of an internal light source 111 (to be described later); 110, an external light source; 111, the internal light source; 112, an external light source light amount controller (light source ON/OFF controller) for controlling the light amount of the external light source 110 which is the light source of a transparent original reading unit connected by the interface circuit 106.

Reference numeral 113 denotes a RAM (Random Access Memory); and 114, a ROM (Read Only Memory). These memories designate the number of storage lines to the line buffer controller 107 (to be described later), and the interface circuit 106 obtains information of the external optional apparatus. The ROM 114 stores a control program used until the light amounts of the internal light source 111 and the external light source 110 stabilize. When the start of scan is designated, therefore, an actual read operation is not started until the light sources 110 and 111 acquire sufficient and stable light amounts.

Reference numeral 115 denotes a switch (to be referred to as a start switch hereinafter) for starting reading. The CPU 108 always monitors the status of this start switch 115. When this start switch 115 is turned on, the light amount controllers 109 and 112 immediately turn on the light sources 111 and 110, respectively, if they are OFF. Simultaneously, the CPU 108 informs the external apparatus 116 (to be described later) by communication via the interface circuit 106 that the user has issued a read request.

The external apparatus 116 such as a computer is connected to the interface circuit 106. This external apparatus 116 contains an application program for operating the image input system according to this embodiment, a resident program for controlling the execution and termination of this application program by receiving the status of the start switch 115 by communication, and an OS (Operating System) as a base for operating these programs. The application program is stored in a disk device. When the execution of this application program is designated, the program is loaded into the RAM 113 and executed. So, a certain time is necessary from the designation of execution to the actual start of execution.

Figure 2:
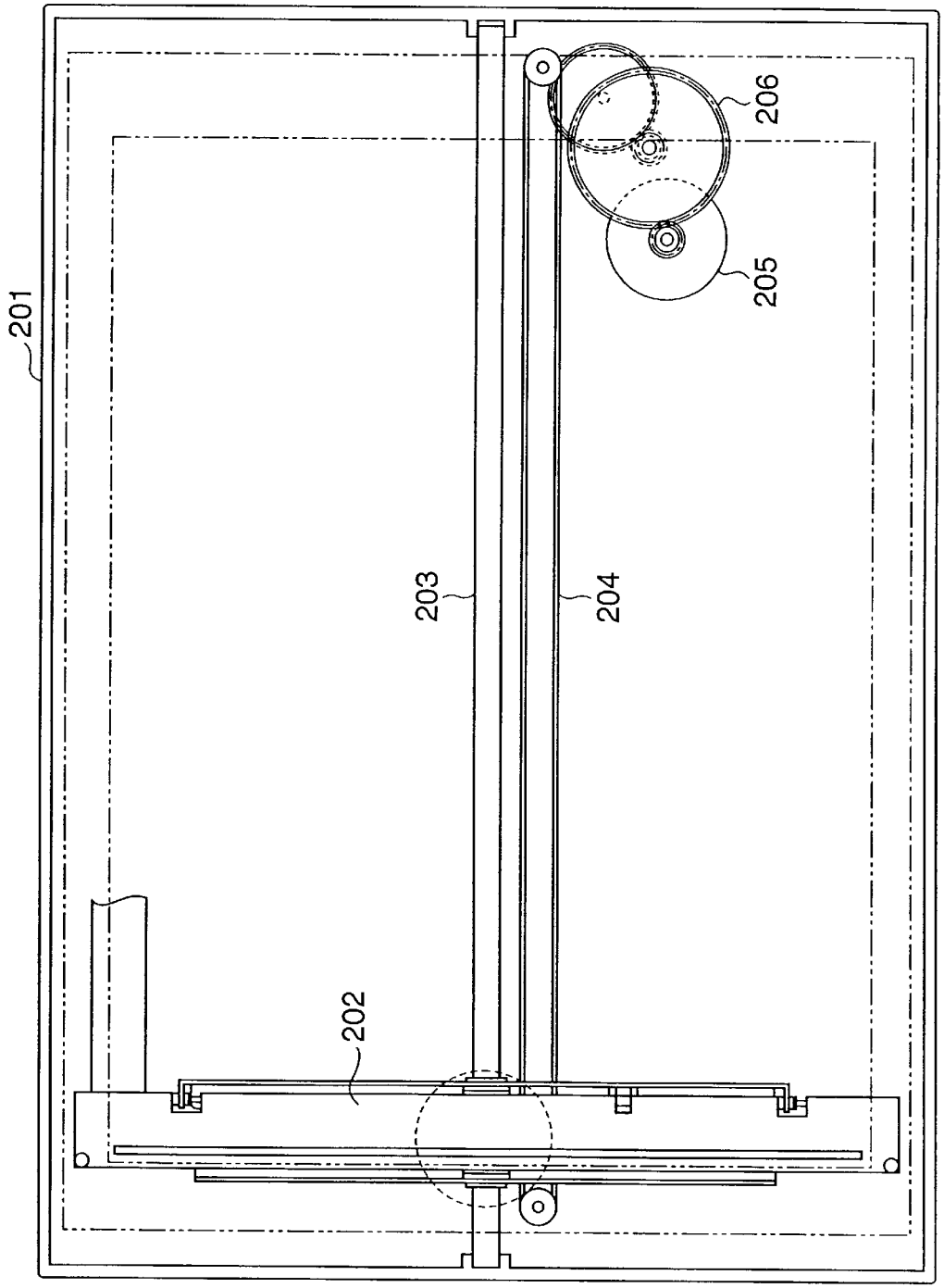
FIG. 2 is a plan view showing the construction of a mechanical portion of the image input system according to the first embodiment of the present invention.

FIG. 2 is a plan view showing the construction of a mechanical portion of the image input system according to this embodiment. Referring to FIG. 2, reference numeral 201 denotes a frame; 202, a sensor unit; and 203, a reference shaft serving as a reference when the sensor unit 202 is moved in a sub-scan direction. Reference numeral 204 denotes an drive belt connected to the sensor unit 202 to operate it along the reference shaft 203; 205, a stepping motor; and 206, gears for transmitting the driving force from the stepping motor 205 to the drive belt 204.

Upon receiving a scan instruction from the external apparatus 116, the CPU 108 of the image input system drives the stepping motor 205 to drive the drive belt 204 via the gears 206. Consequently, the sensor unit 202 moves in the sub-scan direction along the reference shaft 203 to read an image.

Next, changes in the temperature and light amount of a lamp, after the lamp is turned on, used as the light sources 110 and 111 in this embodiment will be explained below with reference to FIG. 3.

Figure 3:
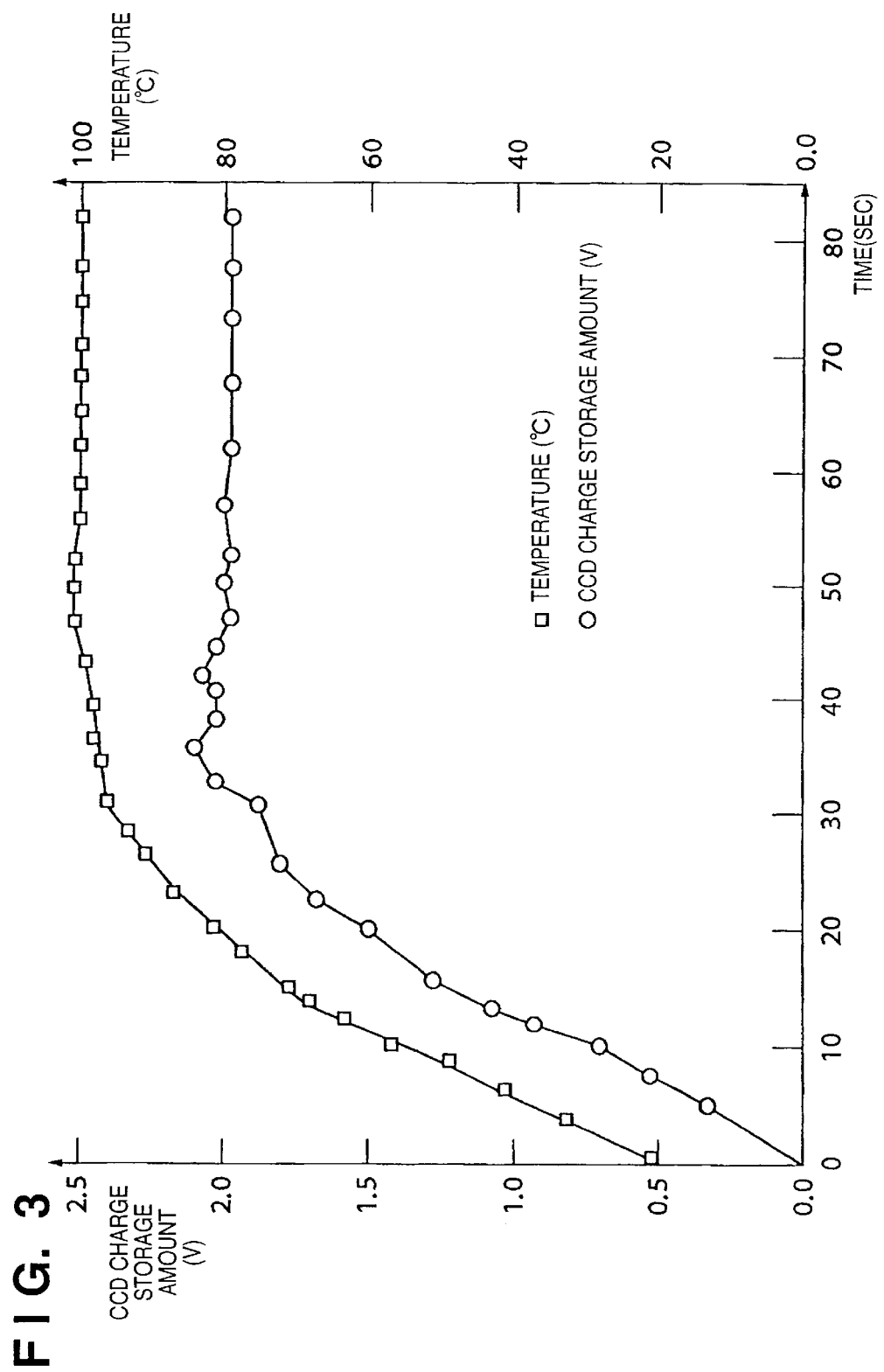
FIG. 3 is a graph showing changes in the temperature and light amount of a lamp, after the lamp is turned on, of the image input system according to the first embodiment of the present invention.

FIG. 3 is a graph showing changes in the temperature and light amount of the lamp, after the lamp is turned on, used as the light sources 110 and 111. The ordinate indicates a CCD charge storage amount (V), and the abscissa indicates time (SEC).

As shown in FIG. 3, the lamp used as the light sources 110 and 111 in this embodiment stabilizes in both temperature and light amount when approximately 60 seconds elapse after the lamp is turned on.

Light amount adjustment control from turning-on of the lamp to stabilization of the light amount performed by the CPU 108 by executing a light amount control program stored in the ROM 114 will be described below with reference to FIG. 4.

Figure 4:
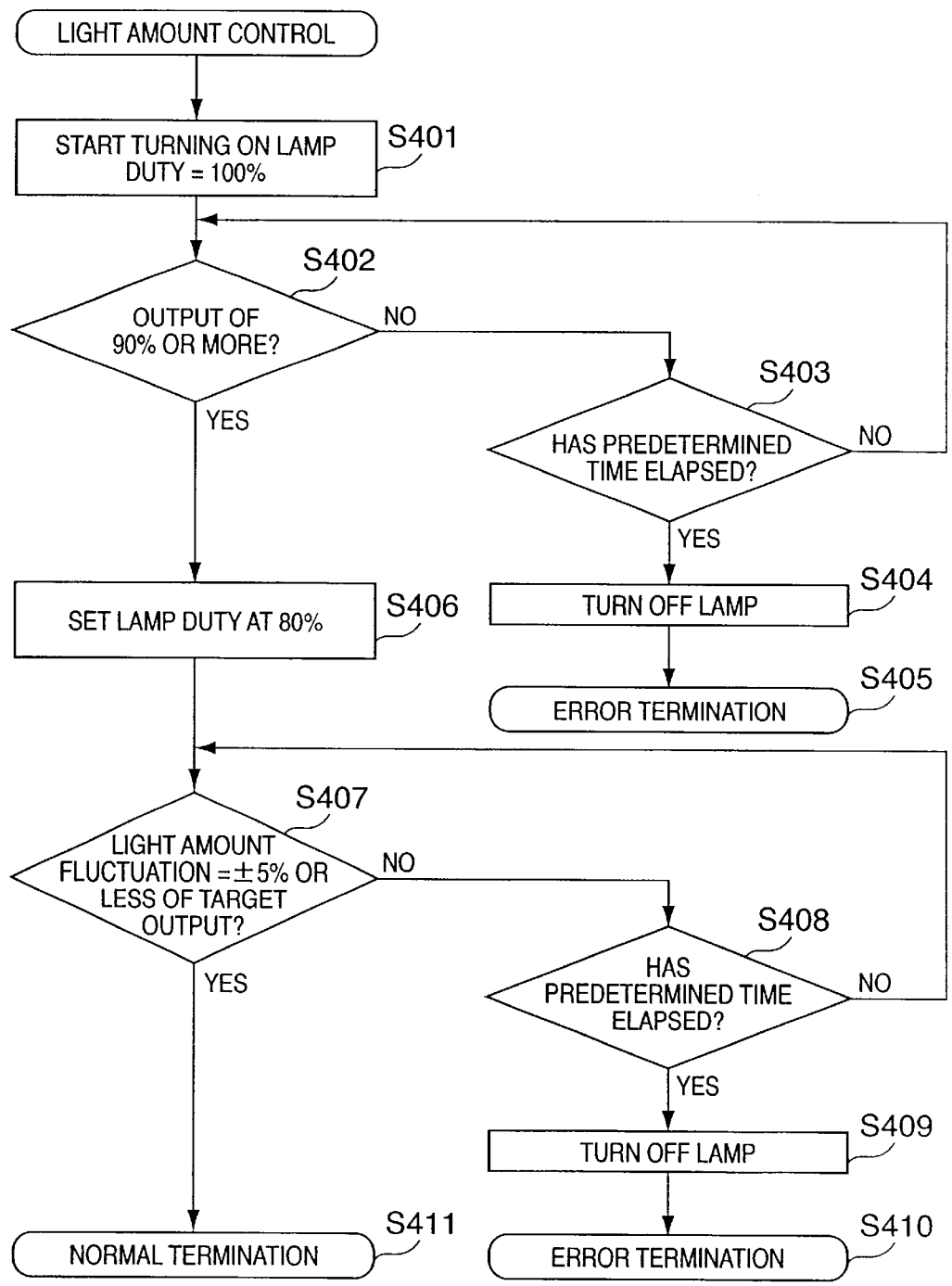
FIG. 4 is a flow chart showing the flow of a light amount adjustment control operation, from turning-on of the lamp to stabilization of the light amount, when a CPU of the image input system according to the first embodiment of the present invention executes a light amount control program stored in a ROM.

FIG. 4 is a flow chart showing the flow of the light amount adjustment control operation from turning-on of the lamp to stabilization of the light amount performed by the CPU 108 by executing the light amount control program stored in the ROM 114.

First, the CPU 108 turns on the lamp by DUTY 100% (step S401). The CPU 108 checks whether a CCD output value of 90% or more is output (step S402). If determining that a CCD output value of 90% or more is not output, the CPU 108 checks whether a predetermined time has elapsed (step S403). If the CPU 108 determines that the predetermined time has not elapsed, the flow returns to step S402. If determining that the predetermined time has elapsed, the CPU 108 determines that there is an error, and turns off the lamp (step S404). After that, the CPU 108 terminates this processing (error termination) (step S405).

On the other hand, if determining in step S402 that a CCD output value of 90% or more is output, the CPU 108 sets the lamp DUTY at 80% (step S406). The CPU 108 then checks whether the light fluctuation amount is ±5% or less of the target output (step S407). If determining that the light fluctuation amount is not ±5% or less of the target output, the CPU 108 checks whether a predetermined time has elapsed (step 408). If the CPU 108 determines that the predetermined time has not elapsed, the flow returns to step S407. If determining that the predetermined time has elapsed, the CPU 108 determines that there is an error, and turns off the lamp (step S409). After that, the CPU 108 terminates this processing (error termination) (step S410).

On the other hand, if determining in step S407 that the light fluctuation amount is ±5% or less of the target output, the CPU 108 terminates this processing (normal termination) (step S411).

The lamp DUTY is set at 100% in step S401 in order to shorten the warming-up time of the lamp. Also, the lamp DUTY is set at 80% in step S406 in order to prevent the saturation of electric charge in the CCD 103.

By the use of this sequence, the light amount of the lamp can be rapidly adjusted.

Figure 5:
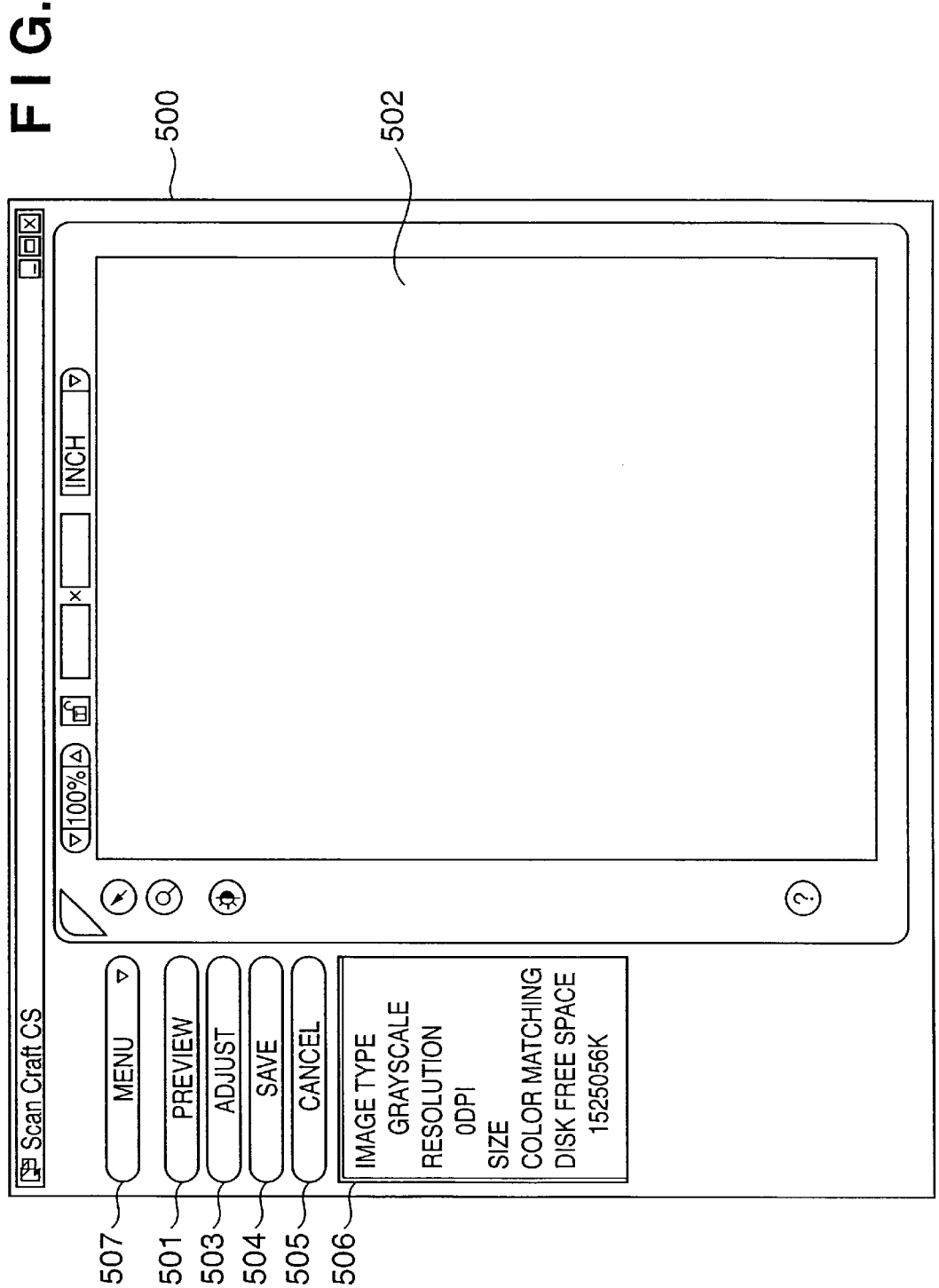
FIG. 5 is a view showing an example of an application program window executed on a computer when an image is read by using the image input system according to the first embodiment of the present invention.

FIG. 5 is a view showing an example of an application program window executed on a computer as the external apparatus 116 when an image is to be read by using the image input system according to this embodiment.

Referring to FIG. 5, reference numeral 500 denotes an application window; 501, a preview button; 502, a preview window in which a previewed image is displayed; and 503, a switch for opening a window for adjusting reading conditions. The reading conditions include whether to read a reflecting original or to read a transparent original by using the light source of an external apparatus. This selection of a reflecting original or a transparent original is stored in the memory and referred to when the light source is turned on. Reference numeral 504 denotes a scan start button; 505, a cancel button for canceling operations when scan and preview are executed; 506, a window for displaying the current resolution, the reading type, the image capacity, and the like; and 507, a switch for opening a window for setting other parameters.

Parameters in these windows are transmitted to the image input system via the interface circuit 106, and loading of the corresponding image is executed.

The control sequence of the lamps as the light sources 110 and 111 will be described below with reference to a state transition diagram shown in FIG. 6.

Figure 6:
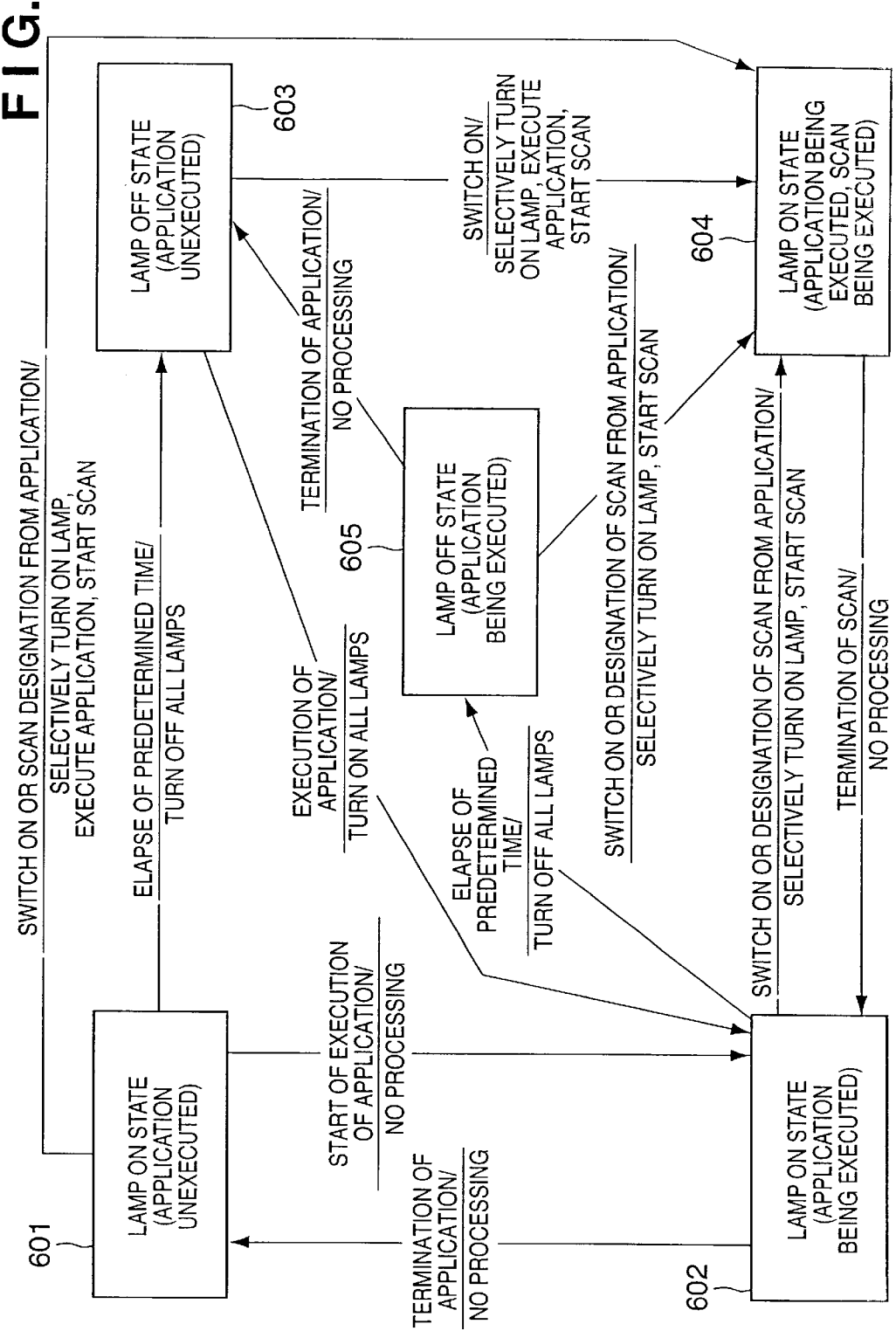
FIG. 6 is a state transition diagram showing lamp control in the image input system according to the first embodiment of the present invention.
Figure 7:
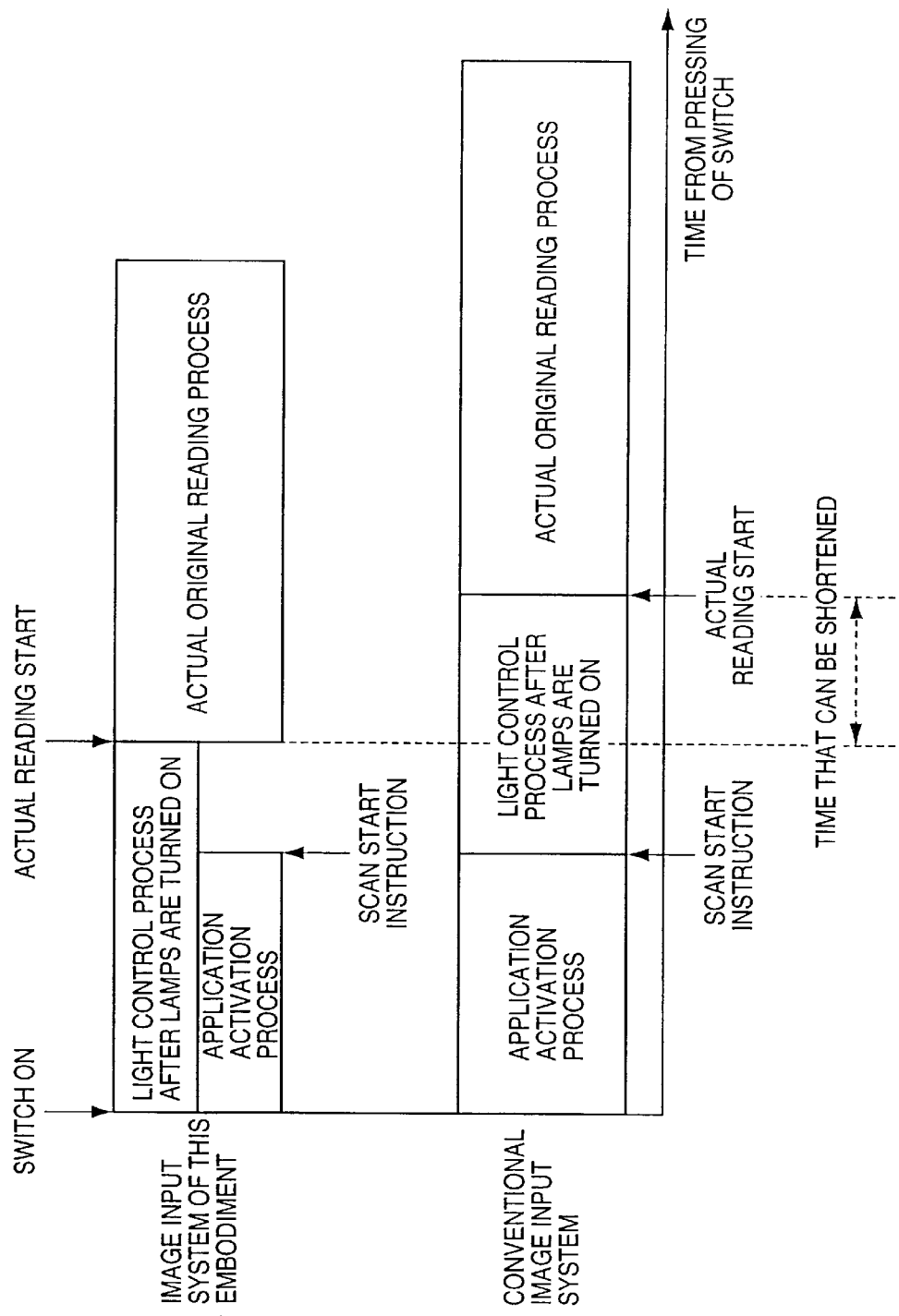
FIGS. 7A and 7B are views for explaining the temporal effect of the image input system according to the first embodiment of the present invention.

Referring to FIG. 6, each arrow between states indicates a state transition. The numerator described on each arrow indicates the condition of a state transition, and the corresponding denominator indicates processing executed when the condition is met.

This state transition diagram in FIG. 6 illustrates the control of the lamps after the power supply is turned on. When the power supply is turned on, state 601 is set if the application program is being executed. Transitions from each state will be explained below.

Transitions from state 601 (the lamps are ON and the application program is unexecuted) are:
If the user starts the execution of the application program, the state transits to state 602, and
If a predetermined time has elapsed, all the lamps are turned off in accordance with the ENERGY STAR standard, and the state transits to state 603.
If the user turns on the start switch 115, the resident program monitoring this start switch 115 turns on a lamp necessary for reading and activates the application program. The application program starts scanning, and the state transits to state 604.

Transitions from state 602 (the lamps are OFF and the application program is being executed) are:
If the user terminates the execution of the application program, the state transits to state 601, and
If a predetermined time has elapsed, all the lamps are turned off in accordance with the ENERGY STAR standard, and the state transits to state 605 (the lamps are OFF and the application program is unexecuted).
If the user turns on the start switch 115 or scan start is designated on the application program, the resident program in the former case or the application program in the latter case selectively turns on a lamp necessary for reading. If the application program has not been activated, the resident program activates the application program to start scanning, and the state transits to state 604.

Transitions from state 603 (the lamps are OFF and the application program is unexecuted) are:
If the user executes the application program, all lamps necessary for reading are turned on, and the state transits to state 602, and
If the user turns on the start switch 115, the resident program selectively turns on a lamp necessary for reading and activates the application program. The activated application program starts scanning, and the state transits to state 604.

A transition from state 605 (the lamps are OFF and the application program is being executed) is:
If the user terminates the execution of the application program, or if the start of scan is designated on the application program, the application program being executed selectively turns on a lamp necessary for reading and starts scanning, and the state transits to state 604.

A transition from state 604 (scan is being executed) is:

If scan is complete, the state transits to state 602.

As described above, if a predetermined time has elapsed the lamps as the light sources 110 and 111 are automatically turned off in accordance with the low power consumption standard. If the application program is activated when the lamps are OFF, all usable lamps are turned on to start light control. If the start switch 115 is turned on when the lamps are OFF, a lamp necessary to start reading is selectively turned on to perform light control. At the same time, the application program is activated to start a read operation. If all the lamps are ON, one lamp is similarly selectively kept on (the other lamp is turned off) to perform light control, and a read operation is started.

The effect of the image input system according to this embodiment will be described below by comparison with prior art with reference to FIGS. 7A and 7B.

FIGS. 7A and 7B are views comparing the flows of processing after the start switch is turned on in the image input system according to this embodiment and a conventional image input system. Referring to FIGS. 7A and 7B, the abscissa indicates the passage of time.

In the conventional image input system as shown in FIG. 7B, the application program is activated after the start switch is turned on. After the application program has issued a scan start instruction, lamps are turned on and light control is performed. Then, actual read control begins.

In contrast, in the image input system according to this embodiment, the application program for controlling the interface shown in FIG. 5 and controlling the image read operation by the scanner differs from the program for turning on the lamps and designating the start of light control. As shown in FIG. 7A, the lamps are turned on and light control is performed at the same time the start switch is turned on. Simultaneously, the application program is activated, and this activated application program issues a scan start instruction. This greatly reduces the actual time required before the start of reading compared to the prior art.

Note that the present invention can be applied to a system constituted by a plurality of devices or to an apparatus comprising a single device. Furthermore, the present invention can also be achieved by supplying a program to a system or an apparatus.

In this case, a storage medium storing an image input system control program represented by software for achieving the present invention is loaded into a system or apparatus, or the control program is loaded into a system or apparatus via a network. In this way, the system or apparatus can achieve the effects of the present invention.

As the storage medium, it is possible to use, e.g., a hard disk, floppy disk, optical disk, magnetooptical disk, CD-R, DVD, magnetic tape, and nonvolatile memory card.

(Second Embodiment)

The second embodiment of the present invention will be described below with reference to FIG. 8.

In the above first embodiment, the lamps serving as the light sources 110 and 111 are turned on at the same time ON of the start switch 115 is detected. However, when the light amount controllers 109 and 112 of these lamps are thus given internal intelligence which detects ON of the start switch 115 and turns on the lamps, the configuration complicates, and the cost increases. The object of this second embodiment, therefore, is to obtain similar effects at low cost by simplifying the configuration.

Figure 8:
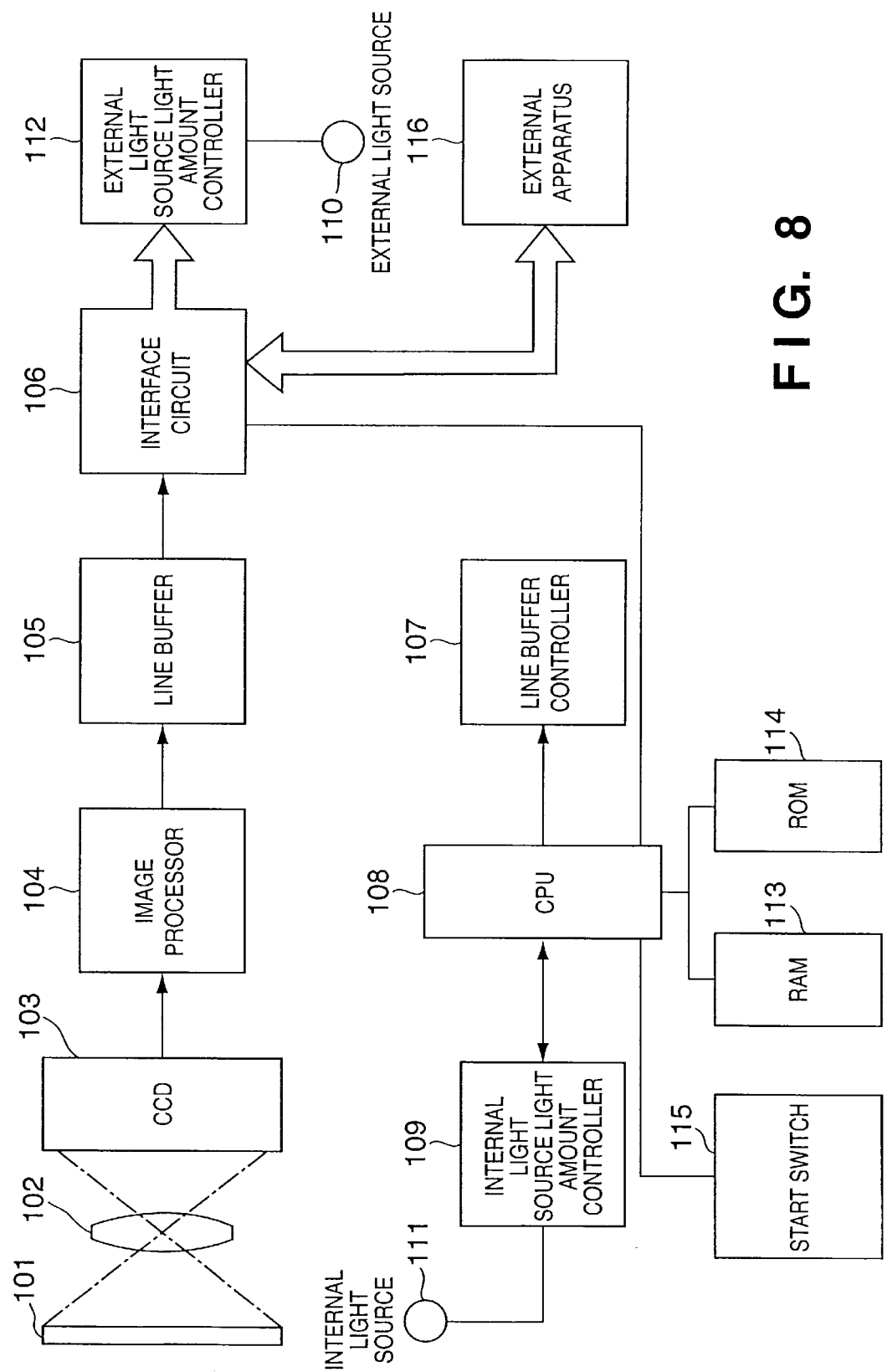
FIG. 8 is a block diagram showing the hardware configuration of an image input system according to the second embodiment of the present invention.

FIG. 8 is a block diagram showing the hardware configuration of an image input system according to the second embodiment of the present invention. Referring to FIG. 8, the same reference numerals as in FIG. 1 of the above-mentioned first embodiment denote the same parts.

The difference of FIG. 8 from FIG. 1 is that a start switch 115 is not connected to a light source light amount controller 109 but connected only to a CPU 108.

A sequence after ON of the start switch 115 is detected in the image input system according to this embodiment is the following procedure.

Lamps are turned on and light amount control is started,

Communication is performed to inform a computer as an external apparatus that the start switch 115 is turned on, and When notified that the start switch 115 is turned on, the computer as the external apparatus 116 activates an application program and issues a scan instruction.

The difference of this embodiment from the aforementioned first embodiment is that when ON of the start switch 115 is detected, "turning on of the lamps and start of light amount control" and "communication to the computer" are performed not simultaneously but in sequence. This simplifies the configuration of the light source light amount controllers 109 and 112 compared to the first embodiment, and also reduces the cost.

The rest of the arrangement and operation according to this embodiment is the same as the first embodiment described above, so a detailed explanation thereof will be omitted.

(Third Embodiment)

The third embodiment of the present invention will be described below.

This embodiment relates to an image input system capable of obtaining effects equivalent to the above-mentioned second embodiment. A sequence of this image input system will be explained below.

Note that the hardware configuration of the image input system according to this embodiment is the same as FIG. 8 of the second embodiment described above, so the configuration will be described with reference to FIG. 8.

When ON of a start switch 115 is detected in the image input system according to this embodiment, a computer as an external apparatus 116 is informed by communication that ON of the start switch 115 is detected. When detecting ON of the start switch 115, the computer as the external apparatus 116 turns on lamps as light sources 110 and 111 and starts light amount control, before activating an application program. This shortens the time before the application program is activated.

The rest of the arrangement and operation according to this embodiment is the same as the first embodiment described above, so a detailed description thereof will be omitted.

In the above explanation, the image input apparatus is equipped with the start switch 115. However, it is also possible to display only a start switch on an operation unit of the external apparatus 116, and run a relatively small program for designating the start of reading.

In the above embodiments, when the detecting means detects that the designating means for designating the start of original image reading designates the start of original image reading, the light source control means turns on a light source for illuminating an original and starts light amount control. This can greatly reduce the waiting time before actual image reading is started, compared to the conventional system in which light source light amount control is started after a user has designated the start of reading. In addition, the use of the image input method of the present invention makes it possible to provide an image input system which is easy to use in accordance with a power saving standard such as ENERGY STAR.

As has been described in detail above, the image input system, image input apparatus, and image input method of each of the above embodiments can reduce the waiting time before actual image reading is started compared to the conventional system. Also, the image input method of each of the above embodiments can provide a power-saving, easy-to-use image input system.

The present invention is not limited to the above embodiments and various changes and modifications can be made within the spirit and scope of the present invention. Therefore, to apprise the public of the scope of the present invention the following claims are made.

What is claimed is:

1. An image input apparatus that can be connected to an external apparatus and can be controlled by said external apparatus, comprising:

a first light source adapted to illuminate an original;

a start switch adapted to start reading of an original image;

a detector adapted to detect a condition of said start switch;

a first light source controller adapted to turn on said first light source when said detector detects that the start switch is turned on; and a communicator adapted to transfer the condition of the start switch to said external apparatus so as to activate a scanning program when said detector detects that the start switch is turned on.

2. The apparatus according to claim 1, wherein said communicator transfers the condition of the start switch to said external apparatus after said first light source controller turned on said first light source.

3. The apparatus according to claim 1, wherein said external apparatus activates the scanning program after said first light source controller turned on said first light source.

4. The apparatus according to claim 1, further comprising:

a second light source adapted to illuminate an original;

a second light source controller adapted to turn on said second light source when said detector detects that the start switch is turned on; and a read mode input unit adapted to input a read mode, wherein said first or second light source controller turns on said first or second light source which corresponds to the read mode inputted by said read mode input unit.

5. The apparatus according to claim 4, wherein the read mode includes a reflecting original read mode and a transparent original read mode.

6. An image input system having an image input apparatus that can be connected to an external apparatus and can be controlled by said external apparatus, comprising:

a light source adapted to illuminate an original;

a start switch adapted to start reading of an original image;

a detector adapted to detect a condition of said start switch;

a light source controller adapted to turn on said light source when said detector detects that the start switch is turned on;

a communicator adapted to transfer the condition of the start switch to said external apparatus so as to activate a scanning program when said detector detects that the start switch is turned on.

7. The system according to claim 6 wherein said communicator transfers the condition of the start switch to said external apparatus after said light source controller turned on said light source.

8. The system according to claim 6, wherein said external apparatus activates the scanning program after said light source controller turned on said light source.

9. The system according to claim 6, further comprising:

a second light source adapted to illuminate an original;

a second light source controller adapted to turn on said second light source when said detector detects that the start switch is turned on;

a read mode input unit adapted to input a read mode, wherein said light source controller or second light source controller turns on said light source or second light source which corresponds to the read mode inputted by said read mode input unit.

10. The system according to claim 9, wherein the read mode includes a reflecting original read mode and a transparent original read mode.

11. The system according to claim 6, further comprising:

a user interface adapted to operate said image input apparatus;

a switch adapted to switch an enabled state and a disabled state of said user interface; and a user interface controller adapted to start turning on control of said light source by said light source controller and activating control of the scanning program.

12. An image input method using an image input apparatus that can be connected to an external apparatus and can be controlled by said external apparatus, comprising:

detection step of detecting a condition of a start switch which starts reading of an original image;

light source control step of turning on a light source, which illuminates an original, when the start switch is turned on; and communication step of transferring the condition of the start switch to the external apparatus so as to activate a scanning program when it is detected that the start switch is turned on in the detection step.

13. The method according to claim 12, wherein the condition of the start switch is transferred to the external apparatus after the light source is turned on.

14. The method according to claim 12, wherein the external apparatus activates the scanning program after the light source is turned on.

15. The method according to claim 12, further comprising:

read mode input step of inputting a read mode; and plurality-of-light source controlling step of turning on or off a plurality of light sources, which illuminate an original, when the start switch is turned on;

wherein one of the plurality of light sources, which corresponds to the read mode inputted in the read mode input step, is turned on.

16. The method according to claim 12, wherein the read mode includes a reflecting original read mode and a transparent original read mode.

17. The method according to claim 12, further comprising:

the reception step of receiving the detection result in the detection step;

the switching step of switching an enabled state and a disabled state of a user interface for operating said image input apparatus; and the user interface control step of turning on said light source in the light source control step and activating the scanning program in the communication step.

18. A program for implementing the image input method according to claim 12.

19. A computer-readable storage medium storing the program according to claim 18.

* * * * *